United States Patent [19]

Suda et al.

[11] Patent Number: 4,681,420

[45] Date of Patent: Jul. 21, 1987

[54] LIGHT MEASURING DEVICE

[75] Inventors: Yasuo Suda; Kiyoshi Alyfuku; Akio Sunouchi; Nobuyuki Suzuki, all of Kanagawa, Japan

[73] Assignee: Canon Kabushiki Kaisha, Tokyo, Japan

[21] Appl. No.: 839,802

[22] Filed: Mar. 12, 1986

Related U.S. Application Data

[63] Continuation of Ser. No. 662,257, Oct. 18, 1984, abandoned.

[30] Foreign Application Priority Data

Oct. 21, 1983 [JP] Japan ................... 58-197336

[51] Int. Cl.[4] .............................................. G03B 3/00
[52] U.S. Cl. .................... 354/409; 354/471; 354/478
[58] Field of Search ............... 354/409, 471, 472, 473, 354/474, 475, 478, 195.11, 195.13, 289.1

[56] References Cited

U.S. PATENT DOCUMENTS

| | | | |
|---|---|---|---|
| 3,860,936 | 1/1975 | Harvey | 354/471 |
| 4,035,815 | 7/1977 | Takahashi | 354/471 |
| 4,146,319 | 3/1979 | Numata et al. | 354/471 |
| 4,361,390 | 11/1982 | Yamada | 354/195.13 |

Primary Examiner—Russell E. Adams
Attorney, Agent, or Firm—Toren, McGeady & Associates

[57] ABSTRACT

The disclosed light measuring arrangement is positioned to receive and measure light from a focusing screen on which a display of focusing conditions is superimposed. A correcting circuit corrects the object brightness sensed by the light measuring arrangement. When display segments of the display are selectively switched on and off, the correcting circuit produces an output signal representing a corresponding brightness correction factor which is applied to the light measuring arrangement.

25 Claims, 11 Drawing Figures

LIGHT MEASURING DEVICE

This is a continuation of application Ser. No. 662,257, filed Oct. 18, 1984 now abandoned.

BACKGROUND OF THE INVENTION

1. Field of the Invention

This invention relates to light measuring devices having display elements on the path of light to be measured, and more particularly to a device for correcting the measured value of light depending on activation or de-activation of the display element.

2. Description of the Prior Art

Known cameras have been provided with finders having display marks indicating the position of an object image relative to the focal plane within the finder's field of view. Such marks generally do not overlap the object image in the field of view of the finder. However, since the marks indicate the direction which a camera distance adjusting ring must be turned, as well as when an in-focus condition is reached, the location of the marks out of the frame of the viewfield of the finder is inconvenient when the photographer focuses the camera visually.

Recently, a so-called superimposed display device has been proposed. The superimposed display superimposes the marks on the object image. To enable the photographer, while looking at the image in the range finder at the center area of the viewfield of the finder, to adjust the distance adjusting ring on the basis of the output of the range finder, this device makes use of a liquid crystal light shutter display plate arranged adjacent to the focusing screen. This liquid crystal plate displays either of two marks in the neighborhood of the range finder area indicating the respective needed direction of rotation of the distance adjusting ring, i.e., clockwise or counterclockwise. When the in-focus condition is detected, the two marks are displayed simultaneously.

However subsequent continuous presentation of these display marks in superimposed relation to the object image in the field of view of the finder may produce eyestrain when shooting. To overcome this drawback, the inventors of the present invention have developed a display device, disclosed in U.S. patent application Ser. No. 613,592, which renders the superimposed display marks entirely transparent within a prescribed time after the in-focus condition is reached. The display of the in-focus condition is then continued by another display element located outside the field of view of the finder. By using this device, quick and easy visual focusing is facilitated by a focusing direction indicating mark in superimposed form. When the in-focus condition is established and detected it is first indicated by the superimposed display to inform the photographer positively that the in-focus state has been reached. Subsequently, the "in-focus" display is transferred from the superimposed to another display element. Thus, obstacles in shooting are overcome.

In a light measuring device where light measurement is performed behind the superimposed display means, for example, in a single lens reflex camera, when the superimposed display is switched off and the external display element is switched on, the illumination on the light receiving element is changed. This creates the problem of suddenly changing the output of the light measuring circuit.

SUMMARY OF THE INVENTION

An object of the present invention is to provide a light measuring device on whose optical path a display element is arranged having a circuit for correcting the light value that changes during the activation and de-activation of the display element.

Other objects of the invention will become apparent from the following detailed description of the embodiments thereof.

DETAILED DESCRIPTION OF THE PREFERRED EMBODIMENTS

Various embodiments of the present invention are next explained on the basis of the drawings.

Figure 1:
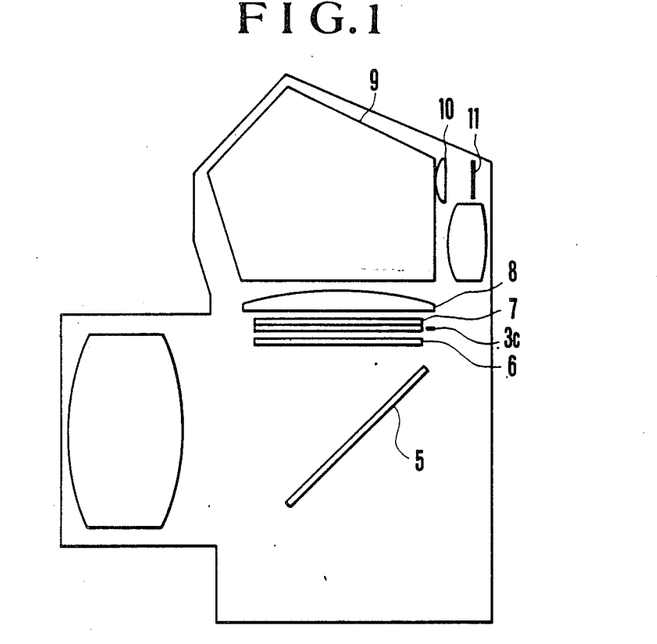
FIG. 1 is a schematic sectional view of the optical system of a display device in a finder of an embodiment of a camera provided with the light measuring device of the present invention.

FIG. 1 illustrates an optical system of the finder of the camera where a 45° mirror 5 reflects light from a photographic lens to a focusing screen 6. A GH phase transfer type liquid crystal display plate 7 is positioned adjacent to the focusing screen 6. The optical system further includes a condenser lens 8, a pentagonal roof type prism 9, and an eyepiece. A collection lens 10 focuses light from the focusing screen 6 onto a photosensitive element 11. Also, element 3c is an LED for an "in-focus" display.

FIGS. 2 thru 6 illustrate displays of focusing conditions by the liquid crystal light shutter display plate 7 in the field of view of the finder of FIG. 1, where 1 is the field of view of the finder with a focusing area 2 at the center thereof. Elements 3a and 3b are marks indicating directions of rotation of a distance adjusting ring on the lens mounting for assisting in bringing the object image into focus as they are selectively activated by the output of a range finder. This display is presented in a superimposed relation to the field of view 1 of the finder as shown in the drawings. When one of the marks 3a and 3b is switched on (activated to shut off the light), a black arrow appears, indicating the direction in which the distance adjusting ring must be turned. The "in-focus" display LED 3c is positioned outside of the viewfield 1 and is lit soon after or in a prescribed amount of time from the moment at which the in-focus condition has been detected, informing the photographer that the photographic lens is in-focus. A circle 4 defines a light measuring area.

Figure 2:
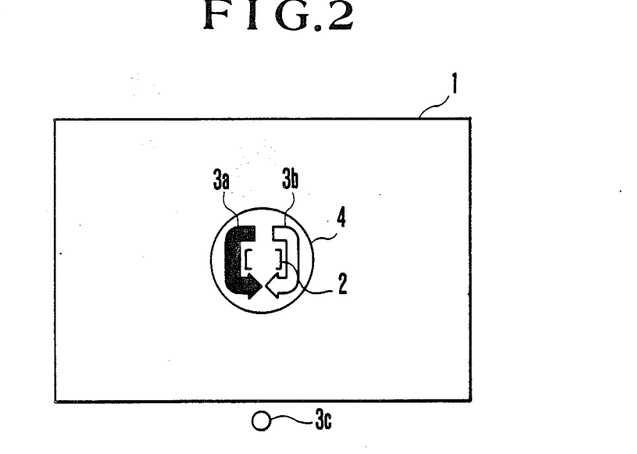
FIGS. 2 thru 7 are plan views of the field of view of the finder with different displays by the device of FIG. 1.
Figure 3:
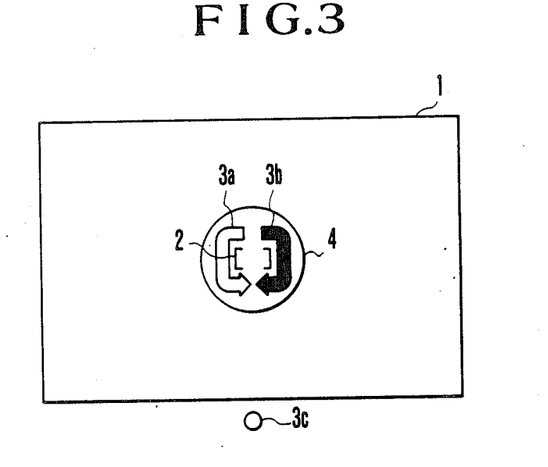
Figure 4:
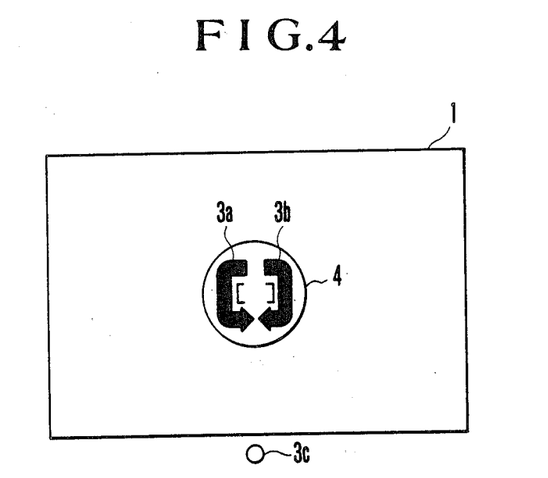
Figure 5:
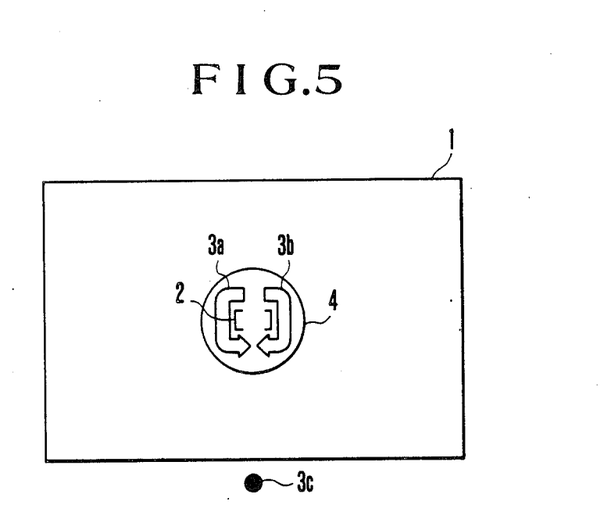
Figure 6:
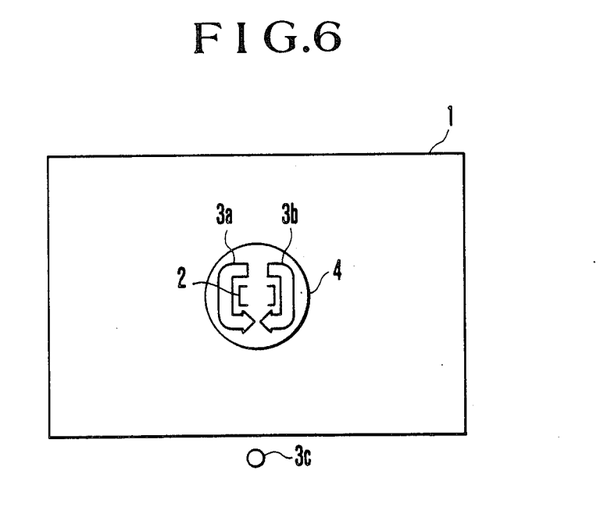

The above-described display device operates in various modes, each of which is explained below:

FIG. 2 is an operative position where the indication mark 3a only is switched on to instruct the photographer to turn his distance adjusting ring in the counterclockwise direction. FIG. 3 is another operative position where the second mark 3b only is switched on to instruct the clockwise turning of the distance adjusting ring. FIGS. 4 and 5 both illustrate presentation of an "in-focus" display in different forms. In FIG. 4, just when the in-focus condition is detected, both of the marks 3a and 3b are switched on together. In a prescribed time from the detection of the in-focus condition, the marks 3a and 3b are switched off and the LED 3c is lit as shown in FIG. 5, informing that the object image remains in-focus. That is, the display is transferred from the superimposed form to the outside-the-viewfield form. When the object lies in a blind area for the range finder, and discrimination between the two directions is impossible, the indication marks 3a and 3b and the LED 3c are all switched off as shown in FIG. 6. In FIGS. 2 to 6, the outlines of the marks 3a and 3b when switched off are depicted for the purpose of better understanding, but, in actual practice, they are invisible to the photographer looking through the finder.

In the camera of FIG. 1, the direction in which the distance adjusting ring must be turned and the detection of when the in-focus condition is established are indicated by means of the liquid crystal light shutter display plate 7. The photosensitive element 11 for light measurement is positioned behind this display means. Therefore, after the in-focus condition has been reached, when the "in-focus" display of the superimposed form disappears and is replaced by the alternative display by the LED 3c outside the field of view of the finder, the illumination on the photosensitive element 11 changes abruptly, causing the measured level of object brightness to change by one or more unit or units.

Figure 7:
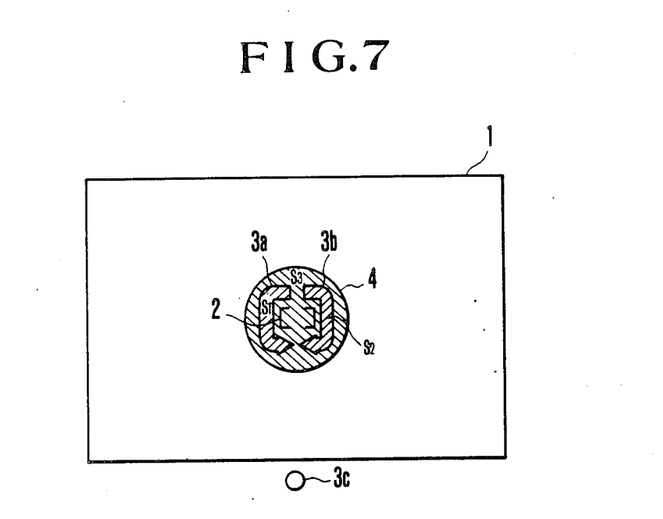

According to the present invention, a circuit is provided for correcting such changed level of object brightness. Before describing the details of this circuit, let us consider how much the illumination changes when the location of the "in-focus" display is shifted from the superimposed position to the outside-the-viewfield LED position by reference to FIGS. 1 and 7.

The part of the image on the focusing screen 6 projected by the lens 10 onto the photosensitive element 11 can be clearly defined as an area 4 of FIGS. 2 to 7 an almost sharp image of the focusing direction indicator mark is also formed on the photosensitive element 11. Letting S1 denote the size of the area of the first mark 3a, S2 the size of the area of the second mark 3b, S3 the size of the light metering area other than the areas S1 and S2, $\alpha 0$ the average transmittance of the mark 3a or 3b when in the light blocking state, $\alpha 1$ the average transmittance of both the mark 3a or 3b when in the transparent state and the other than the marks 3a and 3b, and $\phi$ the intensity of light incident on the light measuring area 4, we have the following equations for the intensity of light $\phi'$ after the passage through the focusing screen 6 and the liquid crystal display plate 7.

(1) When both of the marks 3a and 3b are switched off (transparent) as shown in FIG. 5, $$\phi'1 = \alpha 1 \phi$$

(2) When the first mark 3a only is switched on (blocking light) (FIG. 2), $$\phi'2 = \frac{S1\alpha 0 + S2\alpha 1 + S3\alpha 1}{S1 + S2 + S3} \phi$$

(3) When the second mark 3b only is switched on (FIG. 3), $$\phi'3 = \frac{S1\alpha 1 + S2\alpha 0 + S3\alpha 1}{S1 + S2 + S3} \phi$$

(4) When both of the marks 3a and 3b are switched on (FIG. 4), $$\phi'4 = \frac{S1\alpha 0 + S2\alpha 0 + S3\alpha 1}{S1 + S2 + S3} \phi$$

By putting S1=20 mm$^2$, S2=20 mm$^2$, S3=40 mm$^2$, $\alpha 0 = 0.4$ and $\alpha 1 = 0.7$, the values of $\phi'1$, $\phi'2$, $\phi'3$ and $\phi'4$ are obtained as follows:

$\phi'1 = 0.7\phi$, $\phi'2 = 0.625\phi$, $\phi'3 = 0.625\phi$ and $\phi'4 = 0.55\phi$.

Therefore the illumination on the photosensitive element 11 when in the operative position (4) is 0.786 times as high as when in the operative position (1). This corresponds to a decrease of the exposure value by 0.35EV. In other words, when the display device is switched from the operative position (4) of FIG. 4 to the operative position (1) of FIG. 5, the output of the light measuring device is caused to change by 0.35 Ev. In the case of a camera using an analog display of an exposure value, the needle of the meter will deflect 0.35 Ev. In the case of a camera using a digital display in graduations of 0.5 Ev, it will occur with high probability that the displayed exposure value changes one unit or step.

Figure 8:
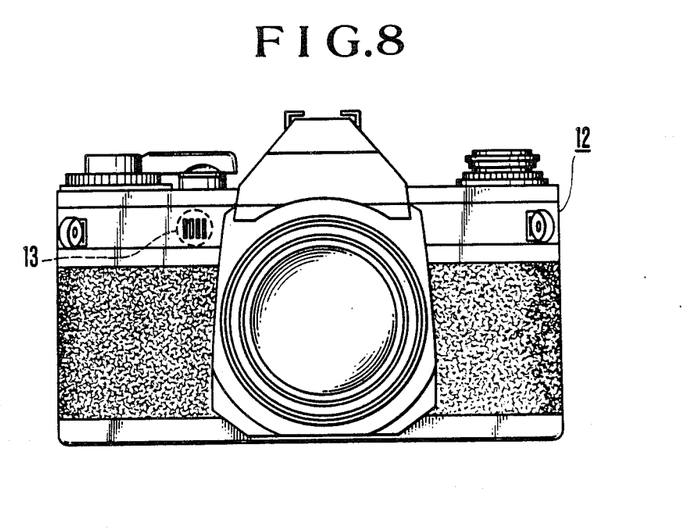
FIG. 8 is a front elevational view of another embodiment of the camera provided with the light measuring device of the invention.

In the foregoing embodiment, the "in-focus" display is transferred from the liquid crystal light shutter display plate 7 after the prescribed time from the detection of the in-focus condition has elapsed to an LED. However, the "in-focus" display may also be transferred. But that means may be otherwise to a buzzer, as shown in FIG. 8, where a buzzer 13 is mounted on the back side of a front panel of the camera housing 12. In this case also, there is need to correct the measured level of object brightness.

Figure 9:
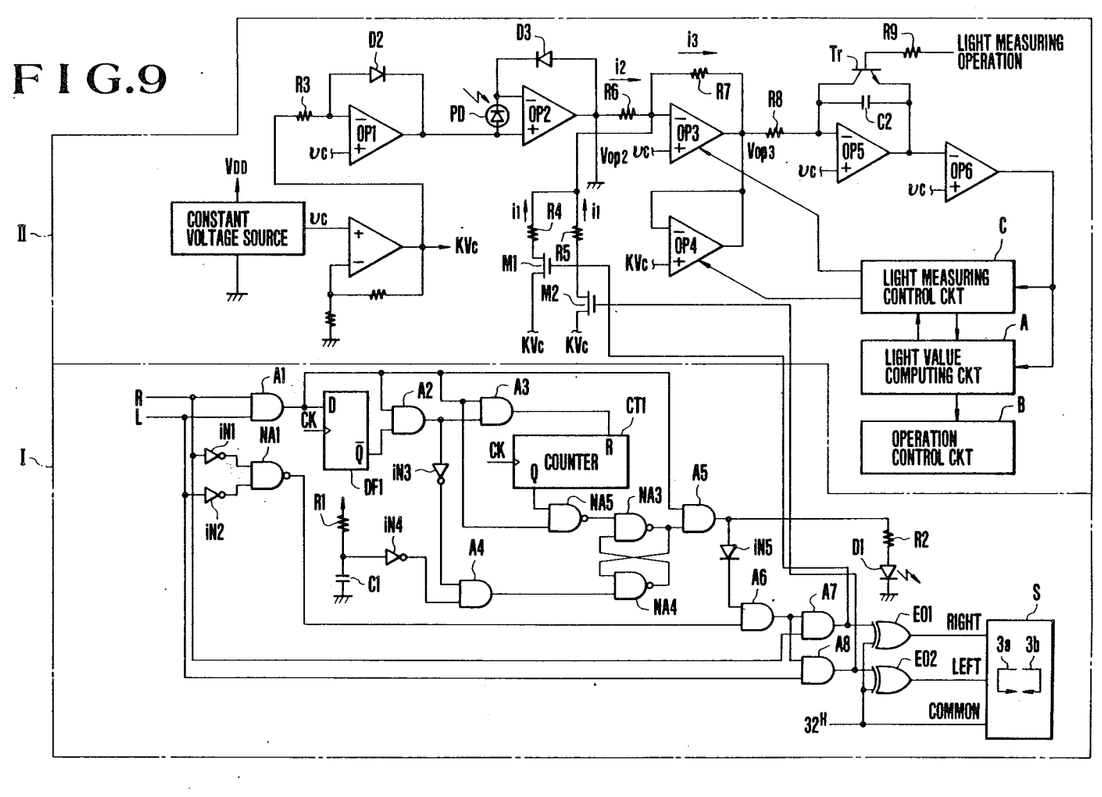
FIG. 9 is an electrical circuit diagram of the camera of FIG. 1.

FIG. 9 illustrates a practical example of the circuitry of the camera including the display device of the type in which the "in-focus" display is transferred from the superimposed to the outside-the-viewfield LED mode. The circuit of FIG. 9 comprises a display circuit I for the liquid crystal unit 7 and the LED 3c and a light measuring and light value correcting circuit II. In the circuit I, S is a display portion within the finder; R and L are inlets to which are applied signals produced by an auto-focus circuit (not shown) indicating the clockwise and counterclockwise directions in which the distance adjusting ring must be turned. Lines labelled "Right", "Left" and "Common" are connected to respective inputs of an LED display device. D1 is an LED for displaying the in-focus condition. AND gates A1 to A8, NAND gates NA1 to NA5, inverters iN1 to iN5, a D flip-flop DF1, a counter CT1, resistors R1 and R2, a condenser C1, exclusive OR gates EO1 and EO2, and a clock (for example, 32 KHz) CK are shown.

The resistor R1, condenser C1 and inverter iN4 constitute a circuit for setting an initial condition when an electrical power source is thrown. The time constant determined by the resistor R1 and condenser C1 is combined with the threshold level of the inverter iN4 to produce a pulse of "H" which is applied to reset a latch circuit comprised of the NAND gates NA3 and NA4.

The output of the NAND gate NA3 becomes "L". Assuming that the image comes into focus under this condition, then the inlets R and L are both "H", and the output of the AND gate A1 becomes "H". Then the AND gate A2 produces one shot of "H", whereby the counter CT1 is reset to start to count time from the beginning. At the same time, the latch of the NAND gate NA3 is reset. In that time, the output Q of the counter CT1 becomes "H", and the output of the NAND gate N5 becomes "L", whereby the latch is inverted. The output of the NAND gate NA3 latches "H", whereby the output of the AND gate A5 is changed to "H" to energize D1 or the LED. At the same time, the output of the inverter iN5 is changed to "L", causing the AND gate A6 to change its output to "L", and therefore causing the AND gates A7 and A8 to change their outputs to "L". Thus, the lines "Right" and "Left" take the same phase as that of the line "Common", switching off the LED.

Alternatively, assuming that the signal only at the inlet R is "H", and the signal at the other inlet L is "L", then the AND gate A1 becomes "L", and the NAND gate NA5 and the AND gate A4 become "H". Therefore, the latch of the NAND gates NA3 and NA4 is left reset. Thus, the AND gate A5 is "L", switching off the LED or D1. Also, the AND gate A7 changes its output to "H", and the AND gate A8 to "L", whereby the phase of the signal on the line "Right" is inverted, and is opposite to the phase of the signal on the line "Common". Since the "Left" signal is of the same phase, only that mark which indicates "Right" is activated. This is the same when the inlets R and L are reversed.

The above-described circuit is the subject matter of the above U.S. patent application Ser. No. 613,592 and described in detail therein. For more detail please refer to it.

Next explanation is given to the Circuit II of the light measuring and light value correcting device will now be described where vc is a proper voltage, KVC is a voltage obtained by multiplying the VC by a factor of K ($>1$). Shown in FIG. 9 are operational amplifiers OP1 to OP6, resistors R3 to R9, MOS transistors M1 and M2 whose gating control inputs are connected to the outputs of the AND gates A7 and A8 of the circuit I so that when the inlets R and L become "H" the MOS transistors M1 and M2 are turned on, diodes D2 and D3, a condenser C2, a transistor Tr and a photosensitive element PD equivalent to that denoted by element 11 in FIG. 1. Light value computing circuit a digitally computes the light value based on the output of the operational amplifier OP6; B is an operation control circuit for controlling the operation of a shutter, or a diaphragm, in accordance with the output of the light value computing circuit A; C is a light measuring control circuit responsive to the output of the operational amplifier OP6 for turning on and off the operational amplifiers OP3 and OP4.

Now assume that the first mark 3a indicating the counterclockwise direction of rotation in the display portion S appears decreasing the illumination on the photosensitive element PD. Responsive to this decrease of the illumination, the operational amplifier OP2 lowers its output by a corresponding magnitude. This tends to increase the output of the operational amplifier OP3. However, because the MOS transistor M2 whose gating control input is connected to the output of the AND gate A8 is turned on, the voltage KVC is brought into connection with the inverting input of the operational amplifier OP3. Thus, the output of the operational amplifier OP3 is controlled in a direction to decrease. Letting i1, i2 and i3 denote the currents flowing through the resistors R5, R6 and R7 respectively, VOP2 and VOP3 the output voltages of the operational amplifiers OP2 and OP3 respectively before the appearance of the first mark 3a, A the factor by which the output of the operational amplifier OP2 changes when the illumination changes ($0<A<1$), and V'OP2 and V'OP3 the outputs of the operational amplifiers OP2 and OP3 respectively after the appearance of the first mark 3a, and using a prime for denoting each of the currents after the activation of the first mark, the required value of R5 for correction of the light value is obtained from, the following equations:

Before activation: $VOP2 - VC = i2R6$ (1)

$$VC - VOP3 = i3R7 \quad (2)$$

$$i1 = 0 \quad (3)$$

After activation: $AVOP2 - VC = i2'R6$ (4)

$$VC = V'OP3 = i3'R7 \quad (5)$$

$$KVC = VC = i1'R5 \quad (6)$$

$$i2' + i1' = i3' \quad (7)$$

$$V'OP3 = VOP3 \quad (8)$$

$$i3' = i3 \quad (9)$$

Substituting (4), (5), (6) and (8) for (7), we obtain $$\frac{AVOP2 - VC}{R6} - \frac{KVC - VC}{R5} = \frac{VC - VOP3}{R7}$$

By re-arranging this, the required value of R5 is found to be:

$$R5 = \frac{(VC - KVC)R6R7}{R7(AVOP2 - VC) + R6(VOP3 - VC)}$$

Using this equation, despite lowering of the illumination by the activation of the first mark 3a, a correct light value can be obtained. For the second mark 3b indicating the clockwise direction of rotation, an equivalent result is effected. When the first and second marks are activated together, the MOS transistors M1 and M2 turn on, causing 2i1 to flow as the correcting current to the inverting input of the operational amplifier OP3.

In such a way as described above, the correction of the object brightness level measured is carried out.

Figure 10:
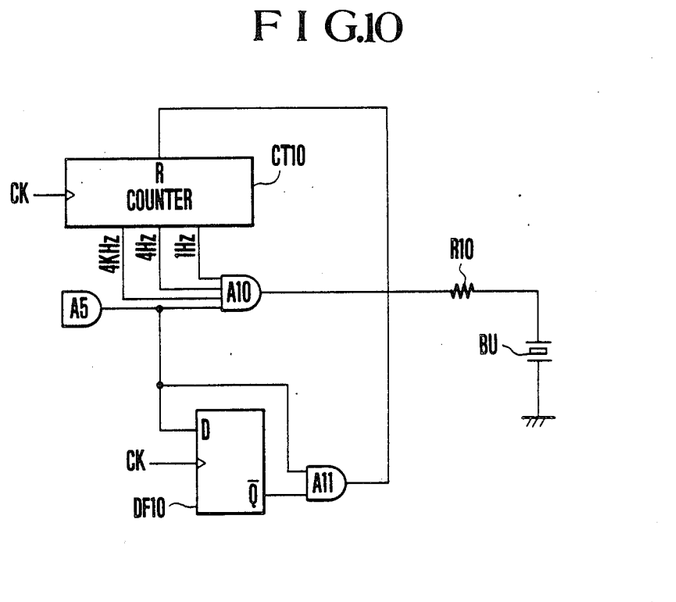
FIG. 10 is an electrical circuit diagram of the camera of FIG. 8.

FIG. 10 is another circuit of the display device using the buzzer of FIG. 8 in place of the LED. Element CT10 is a counter; A10 and A11 are AND gates; A5 is the same gate as that denoted by A5 in FIG. 9; DF10 is a D type flip-flop; R10 is a protection resistor; BU is the buzzer or other suitable piezo-electric loudspeaker.

Figure 11:
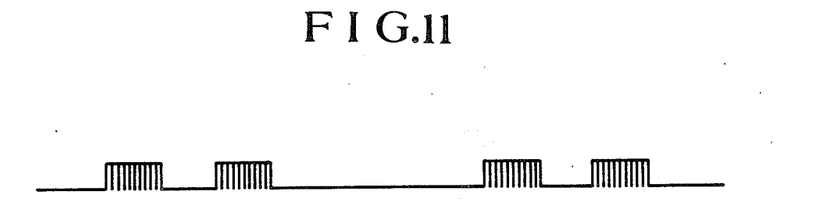
FIG. 11 is a wave form of the output of the circuit of FIG. 10.

The operation of this circuit is as follows: At a moment when the output of the AND gate A5 changes to "H", a one-shot circuit comprised of the D type flip-flop DF10 and the AND gate A11 produces a pulse of short duration, whereby the counter CT10 is reset. The outputs of frequencies 4 KHz, 4 Hz and 1 Hz are then combined by the AND gate A10 to drive the buzzer BU. The waveform of the output of the AND gate A10 is shown in FIG. 11. In this case also, the measured light value is corrected in a similar manner to that described in connection with FIG. 9.

Though the foregoing embodiments have been described in connection with the liquid crystal display unit arranged on the optical path of the light measuring device so that the light value that changes when this display unit is changed over between the activated (light shutting) and the de-activated (transparent) states, is corrected, the correcting circuit of the present invention can be advantageously applied to another type of camera in which a display element that gives off light itself, such as an LED, is positioned adjacent the optical path of the light measuring device. For example, in the case of the aforesaid embodiment of FIG. 2, the LED is positioned in the external neighborhood of the light measuring area 4, an this light emitting display element, when operated between the energized and deenergized states, also causes change of the light value.

As has been described above, the present invention provides for the light measuring device having a display element arranged on or near the optical path thereof with a circuit for correcting the change of the light value resulting from the transition between the activation and deactivation of said display element so that the light value is maintained constant against the transition of the display. Also, even when the exposure value is displayed, it is possible to prevent the displayed exposure value to from flickering.

What is claimed is:

1. A light measuring device comprising:
   (1) display means including a plurality of display elements arranged on an optical path of light measurement, said display elements being capable of being activated and deactivated;
   (2) light measuring means including a light measuring element for measuring a light value;
   (3) correcting means responsive to a plurality of activations or deactivations of said display elements of said display means for correcting a light measuring value of said light measuring means to perform plural kinds of corrections in corresponding to amounts of change in said light measuring value by said light measuring means at said plurality of activations of said display elements; and
   (4) the display elements of said display means being liquid crystal display elements.

2. A ight measuring device according to claim 1, wherein
said correcting means includes means for supplying to said light measuring circuit a measured light value correcting signal for increasing the measured light value, when the display element of said display means is activated to block light, by a magnitude corresponding to the area of said activated display element.

3. A light measuring device comprising:
   (1) display means including a plurality of display elements arranged on an optical path of light measurement, said display elements being capable of being activated and deactivated;
   (2) light measuring means including a light measuring element for measuring a light value;
   (3) correcting means responsive to a plurality of activations or deactivations of said display elements of said means for correcting a light measuring value of said light measuring means to perform plural kinds of corrections in corresponding to amounts of change in said light measuring value by said light measuring means at said plurality of activations of said display elements;
   (4) said light measuring device being incorporated into a single lens reflex camera; and
   (5) the display elements of said display means being liquid crystal display elements.

4. A light measuring device according to claim 3, wherein
said display element is arranged adjacent a focusing screen.

5. A light measuring device according to claim 3, wherein
said correcting means includes means for supplying to said light measuring circuit a measured light value correcting signal for increasing the measured light value, when the display element of said display means is activated to block light, by a magnitude corresponding to the area of said activated display element.

6. A light measuring device comprising:
   (1) display means including a plurality of display elements arranged on an optical path of light measurement, said display elements being capable of being activated and deactivated;
   (2) light measuring means including a light measuring element for measuring a light value;
   (3) correcting means responsive to a plurality of activations or deactivations of said display elements of said means for correcting a light measuring value of said light measuring means to perform plural kinds of corrections in corresponding to amounts of change in said light measuring value by said light measuring means at said plurality of activations of said display elements;
   (4) said light measuring device being incorporated into a single lens reflex camera; and
   (5) the display elements of said display means include means for displaying measured distance information.

7. A light measuring device according to claim 6, wherein
said display element includes means for selectively presenting "near focus", "in focus" and "far focus" displays.

8. A light measuring device comprising:
   (1) display means including a plurality of display elements arranged on an optical path of light measurement, said display elements being capable of being activated and deactivated;
   (2) light measuring means including a light measuring element for measuring a light value;
   (3) correcting means responsive to a plurality of activations or deactivations of said display elements of said display means for correcting a light measuring value of said light measuring means to perform plural kinds of corrections in corresponding to amounts of change in said light measuring value by said light measuring means at said plurality of activations of said display elements; and
   (4) said display elements of said display means including means for displaying measured distance information.

9. A light measuring device according to claim 15, wherein said light measuring device is incorporated into a single lens reflex camera.

10. A light measuring device according to claim 9, wherein said display element is arranged adjacent a focusing screen.

11. A light measuring device according to claim 9, wherein said light measuring element of said light measuring circuit is arranged adjacent a pentagonal roof type prism.

12. A light measuring device according to claim 8, wherein said display element includes means for selectively presenting "near focus", "in focus" and "far focus" display.

13. A camera having a light measuring device comprising:
(a) a light measuring circuit including a photosensitive element for measuring light value;
(b) display means having a plurality of display elements for indicating photographic information, said display elements being arranged to be activated or deactivated and, when activated or deactivated, operating to change the light value measured by said light measuring circuit; and
(c) correcting means responsive to a plurality of activations or deactivations of said display elements of said display means for correcting a light measuring value of said light measuring means to perform plural kinds of corrections in corresponding to amounts of change in said light measuring value by said light measuring means at said plurality of activations of said display elements.

14. A camera having a light measuring device comprising:
(a) display means including a plurality of display elements arranged on an optical path of light measurement, said display elements being capable of being activated and deactivated, and being made of material capable of light shielding;
(b) a light measuring circuit including a light measuring element for measuring a light value; and
(c) correcting means responsive to a plurality of activations or deactivations of said display elements of said display means for correcting a light measuring value of said light measuring means to perform plural kinds of corrections in corresponding to amounts of change in said light measuring value by said light measuring means at said plurality of activations of said display elements.

15. A light measuring device according to claim 14, wherein said display element of said display means is a liquid crystal display element.

16. A light measuring device according to claim 14, wherein said correcting means includes means for supplying to said light measuring circuit a correcting signal for increasing the light value, measured by said light measuring circuit in correspondence to the area of said activated display element, when said display element of said display means is activated to shield the light.

17. A light measuring device according to claim 14, wherein said light measuring device is incorporated into a single lens reflex camera.

18. A light measuring device according to claim 17, wherein said display element is arranged adjacent a focusing screen.

19. A light measuring device according to claim 17, wherein said light measuring element of said light measuring circuit is arranged adjacent a pentagonal roof type prism.

20. A light measuring device according to claim 14, wherein said display element indicated photographic information.

21. A camera having a light measuring device comprising:
(a) a light measuring circuit including a photosensitive element for measuring light value;
(b) display means having a plurality of display elements made of material capable of shielding the light, said display elements being arranged to be activated or deactivated to change the light value measured by said light measuring circuit; and
(c) correcting means responsive to a plurality of activations or deactivations of said display elements of said display means for correcting a light measuring value of said light measuring means to perform plural kinds of corrections in corresponding to amounts of change in said light measuring value by said light measuring means at said plurality of activations of said display elements.

22. A camera having a light measuring device comprising:
(a) display means including a display element arranged on an optical path of light measurement, said display element being capable of being activated and deactivated, and being made of material capable of light shielding;
(b) light measuring means including a light measuring element for measuring a light value; and
(c) correcting means responsive to the activation or deactivation of said display element of said display means for correcting a light measuring value of said light measuring means; said correcting means correcting the output of a light measuring circuit including said light measuring element.

23. A camera having a light measuring device comprising:
(a) display means including a plurality of display elements arranged on an optical path of light measurement, said display elements being capable of being activated and deactivated, and being made of material capable of light shielding;
(b) light measuring means including a light measuring element for measuring a light value; and
(c) correcting means responsive to a plurality of activations or deactivations of said display elements of said display means for correcting a light measuring value of said light measuring means, said correcting means being arranged for correcting the output of a light measuring circuit including said light measuring element and means for performing a plurality of kinds of corrections corresponding to amounts of change in said light measuring value of said light measuring means at said plurality of actuations of said display elements.

24. A camera having a light measuring device comprising:
(a) light measuring means including a photosensitive element for measuring a light value;
(b) display means having a display element for indicating photographic information, said display element being arranged to be activated or deactivated and, when activated or deactivated, operating to change the light value measured by said light measuring means; and
(c) correcting means responsive to the activation or deactivation of said display element of said display means for correcting a light measuring value of said light measuring means, said correcting means being arranged for correcting an an output of a light measuring circuit including said photosensitive element.

25. A camera having a light measuring device comprising:
(a) light measuring means including a photosensitive element for measuring a light value;
(b) display means having a plurality of display elements for indicating photographic information, said display elements being arranged to be activated or deactivated and, when activated or deactivated, operating to change the light value measured by said light measuring means; and
(c) correcting means responsive to a plurality of activations or deactivations of said display elements of said display means for correcting a light measuring value of said light measuring means, said correcting means correcting the output of a light measuring circuit including said light measuring element, and for performing a plurality of kinds of corrections corresponding to amounts of change in said light measuring value of said light measuring means at said plurality of actuations of said display elements.

* * * * *